(12) United States Patent
Qiao (10) Patent No.: US 7,672,277 B2
(45) Date of Patent: Mar. 2, 2010

(54) METHOD AND DEVICE FOR ESTIMATING CARRIER FREQUENCY OFFSET OF SUBSCRIBER TERMINAL

(75) Inventor: Yuanxin Qiao, Beijing (CN)

(73) Assignee: Datang Mobile Communications Co. Ltd., Beijing (CN)

(*) Notice: Subject to any disclaimer, the term of this patent is extended or adjusted under 35 U.S.C. 154(b) by 505 days.

(21) Appl. No.: 10/566,619

(22) PCT Filed: Aug. 4, 2004

(86) PCT No.: PCT/CN2004/000898

§ 371 (c)(1),
(2), (4) Date: Oct. 18, 2006

(87) PCT Pub. No.: WO2005/013524

PCT Pub. Date: Feb. 10, 2005

(65) Prior Publication Data

US 2007/0140203 A1    Jun. 21, 2007

(30) Foreign Application Priority Data

Aug. 4, 2003    (CN) .............................. 03 1 49619

(51) Int. Cl.
H04W 56/00    (2006.01)
(52) U.S. Cl. ................. 370/335; 370/329; 370/332; 370/342
(58) Field of Classification Search ............. 370/335, 370/342
See application file for complete search history.

(56) References Cited

U.S. PATENT DOCUMENTS 6,760,365 B2* 7/2004 Demir et al. ............... 375/150
6,778,588 B2* 8/2004 Li et al. .................... 375/130
6,996,156 B1* 2/2006 Ono ......................... 375/147
7,269,206 B2* 9/2007 Chen et al. ................. 375/150
2003/0108135 A1* 6/2003 Frigon ...................... 375/354
2004/0196793 A1* 10/2004 Lucidarme et al. ......... 370/252

FOREIGN PATENT DOCUMENTS

| CN | 1175171 A | 3/1998 |
|---|---|---|
| CN | 1205142 A | 1/1999 |
| CN | 1286587 A | 3/2001 |
| CN | 1315808 A | 10/2001 |
| CN | 1404662 A | 3/2003 |
| JP | 2001-016120 | 1/2001 |

(Continued)

Primary Examiner—Dwayne Bost
Assistant Examiner—Christopher Henry
(74) Attorney, Agent, or Firm—Merchant & Gould P.C.

(57) ABSTRACT

The invention discloses a method of estimating carrier frequency offset for subscriber terminal, including: determining number of effective base stations from which more than one signals are received by a subscriber terminal; combining the signals of each station corresponding to said number of effective base stations; calculating a rough estimation value of the carrier frequency offset based on combined signal. The invention also discloses a device of estimating carrier frequency offset for subscriber terminal, including: decision module, used to determine the number of effective base stations from which more than one signals received by subscriber terminal, combining module, used to combine the signals of the effective base station and output the combined signal to the carrier frequency offset acquiring module; carrier frequency offset acquiring module, used to estimate the carrier frequency offset of the merged signal. According to the invention, the carrier frequency offset for the subscriber terminal will meet system requirement, and improve cell searching success probability.

10 Claims, 4 Drawing Sheets

FOREIGN PATENT DOCUMENTS

| | | |
|---|---|---|
| JP | 2001-102960 | 4/2001 |
| JP | 2002/043978 | 2/2002 |
| JP | 2003-309491 | 10/2003 |
| WO | WO 01/74103 A1 | 4/2001 |

* cited by examiner

METHOD AND DEVICE FOR ESTIMATING CARRIER FREQUENCY OFFSET OF SUBSCRIBER TERMINAL

BACKGROUND OF THE INVENTION

1. Field of the Invention

The present invention relates to Code Division Multiple Access (CDMA) for mobile communications, more particularly to a method and device for estimating carrier frequency offset (CFO) in subscriber terminals in Time Division Synchronous Code Division Multiple Access (TD-SCDMA) system.

2. Description of the Related Art

In the TD-SCDMA system, both base stations and terminals are supposed to send and receive data with nominal carrier frequency. However, there is always some deviation between the actual transmitting and receiving frequency and the nominal frequency because of the technology limitation of the devices. In a base station, the frequency accuracy of an oscillator, in which a carrier frequency offset in a base station required by a TD-SCDMA system is less than 0.05 PPM, may meet to the standard requirement, since limitations subjected by a base station from temperature, size, power consumption, cost and the like are smaller. In a subscriber terminal, however, a carrier frequency offset in a subscriber terminal required by the TD-SCDMA system is less than 0.1 PPM, the frequency accuracy of a selected oscillator may not meet the standard requirement, due to the limitations subjected by the subscriber terminal from temperature, size, power consumption, cost and the like are greater. Consequently, carrier frequency offsets need to be estimated in a subscriber terminal by using a known synchronous downlink pilot signal (SYNC_DL) sent by base stations, and according to the estimated value of carrier frequency offsets to perform automatic frequency control (AFC), so that carrier frequency offsets in the subscriber terminal may meet the standard system requirements.

Figure 1:
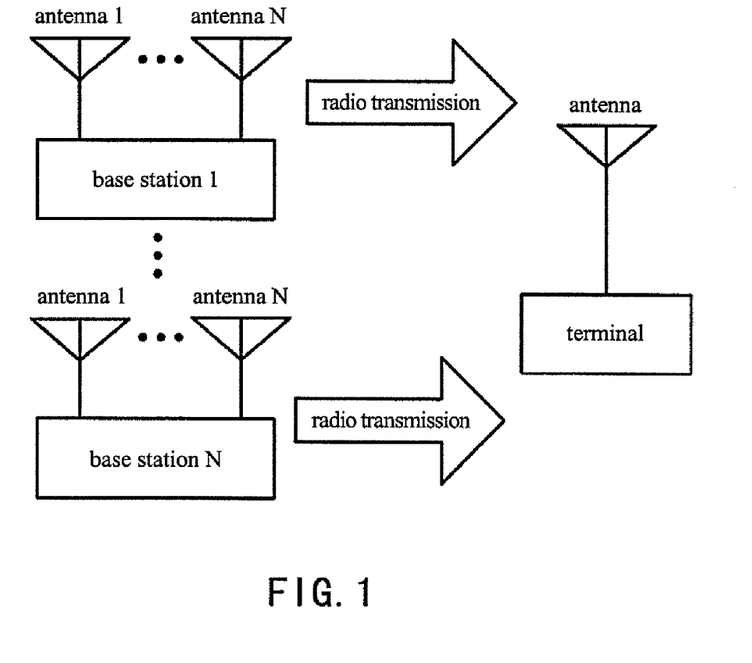
FIG. 1 shows a schematic diagram of a prior art system having several base stations for estimating carrier frequency offset.

In a method for estimating carrier frequency offset in prior art, SYNC_DL signals only send by a single base station are utilized in a subscriber terminal to estimate the carrier frequency offset. The base station has one or more antennas to transmit signals with the same carrier frequency. FIG. 1 is a schematic diagram showing a carrier frequency offset estimation system having a plurality of base stations in the prior art.

In the TD-SCDMA system, a dedicated downlink pilot time slot (DwPTS) is set, a base station sends SYNC_DL signals at DwPTS of each frame. Codes by which a SYNC_DL signal is consisted of are used to distinguish adjacent cells using the same carrier frequency, that is, the adjacent cells with the same carrier frequency are distinguished by the SYNC_DL codes. There are 32 different SYNC_DL codes defined in the standard, length of each set of SYNC_DL codes is 64 chips. During the initial search of the cells, the subscriber terminal search the SYNC_DL codes at a specific frequency point used in a cell where it currently expects to resided in to implement the downlink synchronization, and then estimate the carrier frequency offset based on the SYNC_DL codes and adjust the carrier frequency according to the estimated carrier frequency offset value to meet the system requirements.

Provided that the system requires for carrier frequency offset estimation and rough adjusting, adjusted carrier frequency offset in a subscriber terminal is less than 1 kHz, then the subscriber terminal has only received, at a corresponding frequency point, the SYNC_DL signals transmitted by one base station or received SYNC_DL signals of the cell currently expected to resided in are much greater than the SYNC_DL signals of other cells using a same frequency. If the signal power ratio is over 6 dB, it is possible for the adjusted carrier frequency offset of a subscriber terminal to meet to the system requirement. However, if the power difference between the simultaneously received SYNC_DL signals respectively in two cells with the same frequency is small, the SYNC_DL signals transmitted by one cell will interfere those transmitted by another cell. For example, when the power ratios of multiple SYNC_DL signals received by a subscriber terminal at the edge of several cells are within 3 dB, there is about 10-20% probability with the existing methods for carrier frequency offset estimation and adjustment that the carrier frequency offset of the subscriber terminal can't meet the requirement of the system.

In the TD-SCDMA system, because of the short length of a SYNC_DL signal, which is only 64 chips (50 μs), the carrier frequency offset after adjustment permitted by the standard is still greater, for example, less than 1 kHz. Even so, as shown in FIG. 1, when the subscriber terminal simultaneously receives SYNC_DL signals from several base stations, and whose power differences are small such as within 3 dB by using an existing method for carrier frequency offset estimation, which only uses the received SYNC_DL signal in a cell (base station) where it currently expects to reside in, i.e., the highest power SYNC_DL signal, to make a carrier frequency offset estimation, there is about 10-20% probability that the carrier frequency offset in the subscriber terminal after automatic frequency control can't be below 1 kHz. In this case, the initiate search for a cell by a subscriber terminal will not be implemented and probability of success for the initiate search for a cell will be affected.

SUMMARY OF THE INVENTION

In view of this, an object of the present invention is to provide a method and a device for estimating carrier frequency offset in a subscriber to make the carrier frequency offset in a subscriber terminal meet the system requirements and thus improve the probability of success for the initiate search for a cell.

To achieve the above object, the present invention provides a method for estimating carrier frequency offset in a subscriber terminal in TD-SCDMA system, the method comprises steps:

A. determining number of effective base stations with same carrier frequency from which more than one signals are received by a subscriber terminal and main path positions of each signal;

B. combining the signals of each base station with same carrier frequency corresponding to the number of effective base stations with same carrier frequency based on the main path positions obtained in step A;

C. calculating a rough estimation value of the carrier frequency offset based on combined signal in step B.

The determining number of effective base stations with same carrier frequency from which more than one signals are received by a subscriber terminal in step A comprises steps:

A1. calculating peak power value of each signal received by a subscriber terminal, and selecting the peak power values of predefined maximum number of base stations from higher to lower;

A2. determining the number of effective base stations with same carrier frequency from the signals determined in step A1 by the predefined maximum number of base stations with same carrier frequency are received by the subscriber terminal by comparing the ratio of the highest peak power value from the order in step A1 to the subsequent peak power values with the given threshold.

The signals are synchronous downlink pilot signals, and the step A1 further comprises steps:

A11. shift multiple correlating a local synchronous downlink pilot code and a received synchronous downlink pilot signal resulting in a power value of the synchronous downlink pilot signals received by the subscriber terminal;

A12. determining peak power values corresponding to each of the synchronous downlink pilot codes.

Step A2 further comprises steps:

A21. numbering the peak power values ordered from the highest to the lowest and setting a current sequence number as predefined number of the base stations with same carrier frequency;

A22. determining whether the highest peak power value and a peak power value corresponding to the current sequence number are greater than the given threshold, if so, setting the number of effective base stations with same carrier frequency from which the signals are received by a subscriber terminal as the value of the current sequence number, otherwise, the current sequence number decreases by one and returns back to step A22.

The method further comprises a step before step A: reading vector data of 128 chips while receiving synchronous downlink pilot signals at the beginning of a downlink pilot time slot.

The method further comprises a step before step B: multi-path combining signals of each base station with same carrier frequency.

The step of multi-path combining signals of each base station with same carrier frequency comprises steps:

beginning from a point of previously predetermined number of the peak power value, reading data of synchronous downlink pilot signals at a point which is 2 times of a predefined value added length of the synchronous downlink pilot code;

performing Max Ratio Combination after eliminating phase difference between symbols of multi-path synchronous downlink pilot signal with different time delay and the phase difference of delay path.

Step B of combining the signals of each base station with same carrier frequency corresponding to the number of effective base stations with same carrier frequency is: equal gain combining or weight combining signals of each base station with same carrier frequency corresponding to the number of base stations with same carrier frequency to obtain an combined signal sequence.

Step C is to obtain a rough estimating value of the carrier frequency offset according to the phase difference between two symbols spaced by a defined distant in the combined signal sequence.

Step C further comprises: estimating carrier frequency offset for a predefined times, and then averaging them to get a carrier frequency offset estimation.

Step C is to sum up the phase differences between two symbols spaced by a defined distant in said combined signal sequence, and then computing the phase angle to get the carrier frequency offset estimation.

The invention also provides a device for estimating carrier frequency offset in TD-SCDMA system, which comprises at least:

a decision module for determining effective the number of base stations with same carrier frequency from which signals are received by a subscriber terminal and a main path position of signal transmitted from each base station with same carrier frequency based on the signals received by a subscriber terminal, and then outputting the number of the effective base station and the main path position of each signal to an combining module;

an combining module for combining the signals from each base station corresponding to the number of effective base stations with same carrier frequency based on the main path position of signals and then outputting the combined signals to a carrier frequency offset acquiring module;

a carrier frequency offset acquiring module for calculating a rough estimating value of the carrier frequency offset based on the combined signals.

The device further comprises a multi-path combining module for multi-path combining the signals of each base station with same carrier frequency, and then outputting the multi-path combined signal to the combining module, if the number of effective base stations with same carrier frequency is greater than 1.

According to a solution of the invention, when a subscriber terminal simultaneously receives SYNC_DL signals sent by a plurality of base stations (more than one) and their power differences are small, it is possible to make the carrier frequency offset in a subscriber terminal, after automatic frequency control, to meet the system requirement and thus improve the probability of success for the initiate search for a cell.

The method for estimating carrier frequency offset provided by the invention is especially suitable to a condition that the strengths and SIR of SYNC_DL signals received by a mobile user from several base stations are approximate among them, i.e., a mobile user is located at the joint edge of several cells, and with the method for carrier frequency offset estimation provided by the invention, the probability of success for the initiate search for a cell can be improved greatly. Even when the SYNC_DL signal received by a mobile user from one base station is much stronger and those received from other base stations are not so strong, the accuracy of adjustment for carrier frequency offset also can be improved by using the method for estimating carrier frequency offset provided by the invention. With respect to a method utilizing the SYNC_DL signals from one base station, the closer of the SYNC_DL signal strength and SIR from several base stations, the more improvement the accuracy of carrier frequency offset adjustment.

DETAILED DESCRIPTION

Hereinafter, detailed description will be made to a method and device for estimating carrier frequency offset in a subscriber terminal in TD-SCDMA system according to the embodiments of the invention, with reference to accompanying drawings, so that the invention will be well understood by those skilled in the art.

Figure 2:
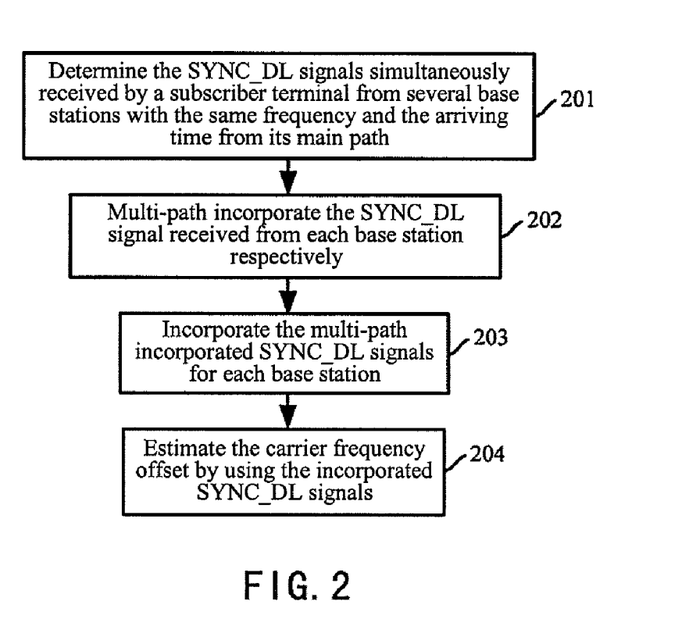
FIG. 2 shows a flow chart for estimating carrier frequency offset in a subscriber terminal according to the invention.
Figure 3:
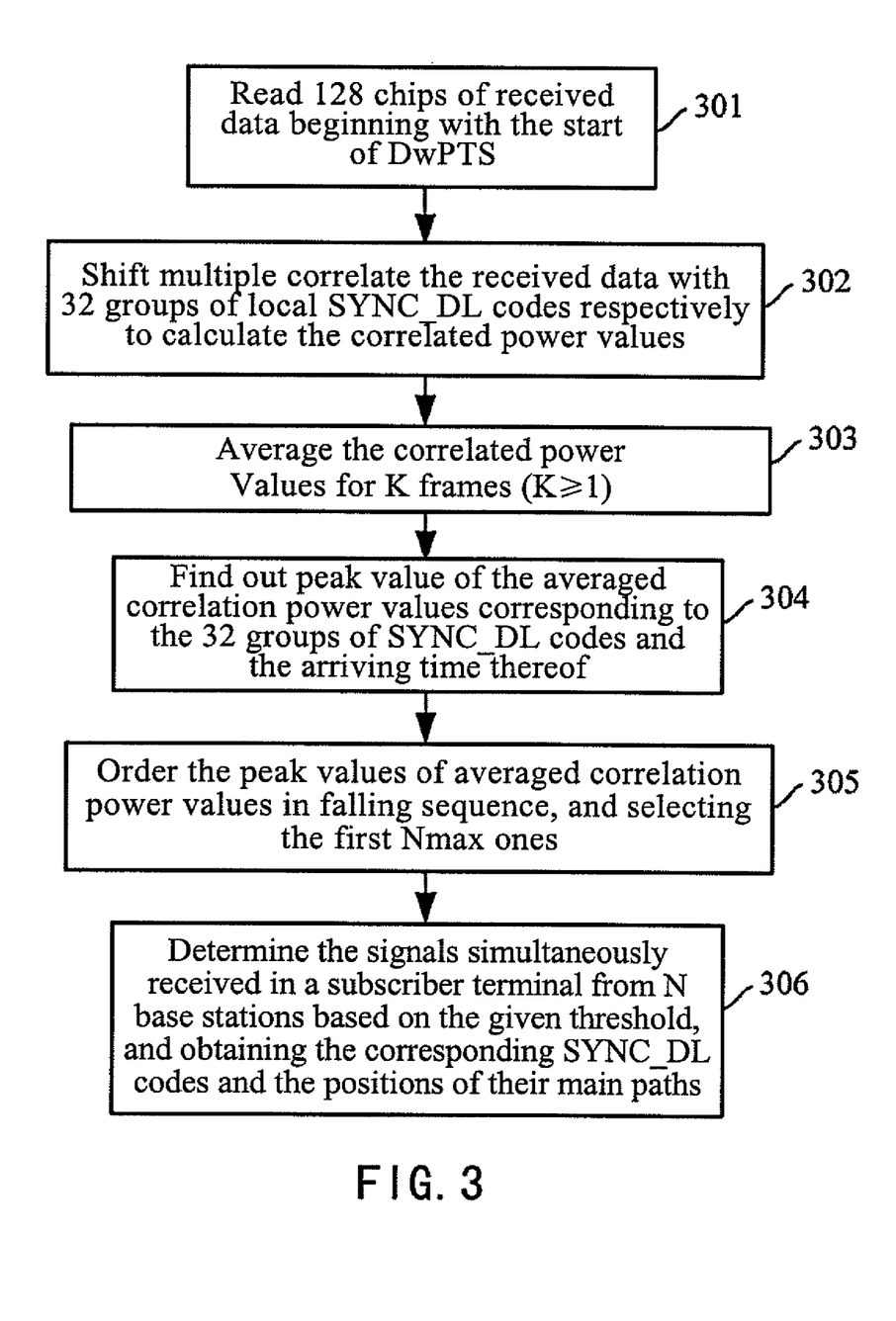
FIG. 3 is a detailed flow chart showing the determination of the SYNC_DL signals simultaneously received by a subscriber terminal from several base stations with the same frequency and the arriving time from its main path in the steps as shown in FIG. 2.

FIG. 2 shows a flow chart for estimating carrier frequency offset in a subscriber terminal according to the invention, and FIG. 3 is a detailed flow chart showing SYNC_DL signals simultaneously received by a subscriber terminal from several effective base stations with the same frequency and arriving time from respective main path determined in step 201 shown in FIG. 2.

The first step, in step 201, determines the SYNC_DL signals simultaneously received by a subscriber terminal from several effective base stations with the same frequency and the respective arriving time of their main path.

FIG. 3 illustrates the detailed flow chart in step 201. In step 301, after the synchronization of DwPTS in a subscriber terminal, 128 chips of data $\underline{r}$ are read beginning with the start of DwPTS, where the kth element is denoted as $r_k$, k-0, 1, . . . , 127.

Then, in step 302, shift complex correlation with the data received at DwPTS to 32 groups of local SYNC_DL codes respectively, shifting from 0 to 63, i.e., calculate the correlation power values of each point.

In step 303, the correlated power values for K frames are averaged (K≧1).

The signal powers for two successive frames arrived at a subscriber terminal may be different because of fading, etc,. To ensure the accuracy of the data obtained in a subscriber terminal, it is preferable to calculate the correlation power by using more frames of data and then average them.

Then, in step 304, averaged correlation power values corresponding to SYNC_DL codes of each group in 32 groups are fined out; the arriving time for the SYNC_DL signals corresponding to the SYNC_DL codes are determined by the SYNC_DL codes, i.e., the arriving time for the main path of the SYNC_DL signals corresponding to the SYNC_DL codes; and, shift complex correlation with data $\underline{r}$ to the SYNC_DL codes to obtain the peak value of correlation power, which indicates the synchronization of received signals and the corresponding SYNC_DL codes.

In step 305, the peak values of the averaged correlation power are ordered in a falling sequence, and the first $N_{max}$ ones are selected, denoted as $P_{max}(n)$, n=1, 2, . . . , $N_{max}$. $N_{max}$ is a predefined value, and represents the max number of base stations in which a subscriber terminal receives the SYNC_DL signals from different base stations simultaneously.

In step 306, since a subscriber terminal is not able to know how many SYNC_DL signals are received simultaneously from base stations when it receives SYNC_DL signals, thus it is needed to determine the number N of effective base stations from which the SYNC_DL signals have been received simultaneously, based on a threshold, set the threshold $V_T$, and firstly decide whether the $N_{max}$th peak value of the averaged correlation power meets following condition:

$$\frac{P_{max}(1)}{P_{max}(N_{max})} > V_T$$

If yes, N=$N_{max}$; otherwise, continue to decide whether the ($N_{max}$−1)th peak value of the averaged correlation power values meets following condition:

$$\frac{P_{max}(1)}{P_{max}(N_{max}-1)} > V_T$$

If yes, N=$N_{max}$−1; otherwise, the rest may be deduced by analogy, until the number N of effective base stations, from which a subscriber terminal receives the SYNC_DL signals simultaneously, is determined, where 1≦N≦$N_{max}$. The SYNC_DL codes sequence number and the peak values point corresponding to each of the N base stations are recorded as Sync_$ID_n$ and Peak$_n$ respectively, where n=1, 2, . . . , N.

In the embodiment of the invention, $N_{max}$=3, and $V_T$=4.

The second step, in step 202, combine multipath signals of SYNC_DL received from each effective base station respectively.

Then, the complex SYNC_DL codes numbered as Sync_$ID_n$ are operated, and the complex values of SYNC_DL codes are marked as $\underline{s_n}$, where the kth element is $s_{n,k}$, k=0, 1, . . . , 63. 64+2M points of data are read beginning from M chips ahead of Peak$_n$ in the DwPTS of the received signals, marked as a vector $\underline{e}$, where the kth element is $e_k$, k=1, 2, . . . , 63+2M.

$\underline{e}$ is shift complex correlated with $\underline{s_n}$, and the result $\underline{cor_n}$ is obtained:

$$cor_{n,i} = \sum_{k=0}^{63} e_{i+k} \cdot s^*_{n,k}, i = 0, 1, \ldots, 2M,$$

then the SYNC_DL signals of each paths are combined and a vector $\underline{U_n}$ is obtained $$U_{n,k} = \sum_{i=0}^{2M} e_{i+k} \cdot s^*_{n,k} \cdot cor^*_{n,i}, k = 0, 1, \ldots, 63,$$

where, $s^*_{n,k}$ indicates a conjugate of $s_{n,k}$, and $cor^*_{n,i}$ indicates a conjugate of $cor_{n,i}$.

The physical meaning of the formula is to perform Max Ratio Combining of multi-path SYNC_DL signals with different time delay after eliminating the phase differences both between the symbols and between the time delay paths, in which, received signals $\underline{e}$ multiplied by the conjugate of $\underline{s_n}$ corresponds to eliminating the phase difference between symbols, and multiplied by the conjugate of $\underline{cor_n}$ corresponds to eliminating the phase difference between time delay paths.

Figure 4:
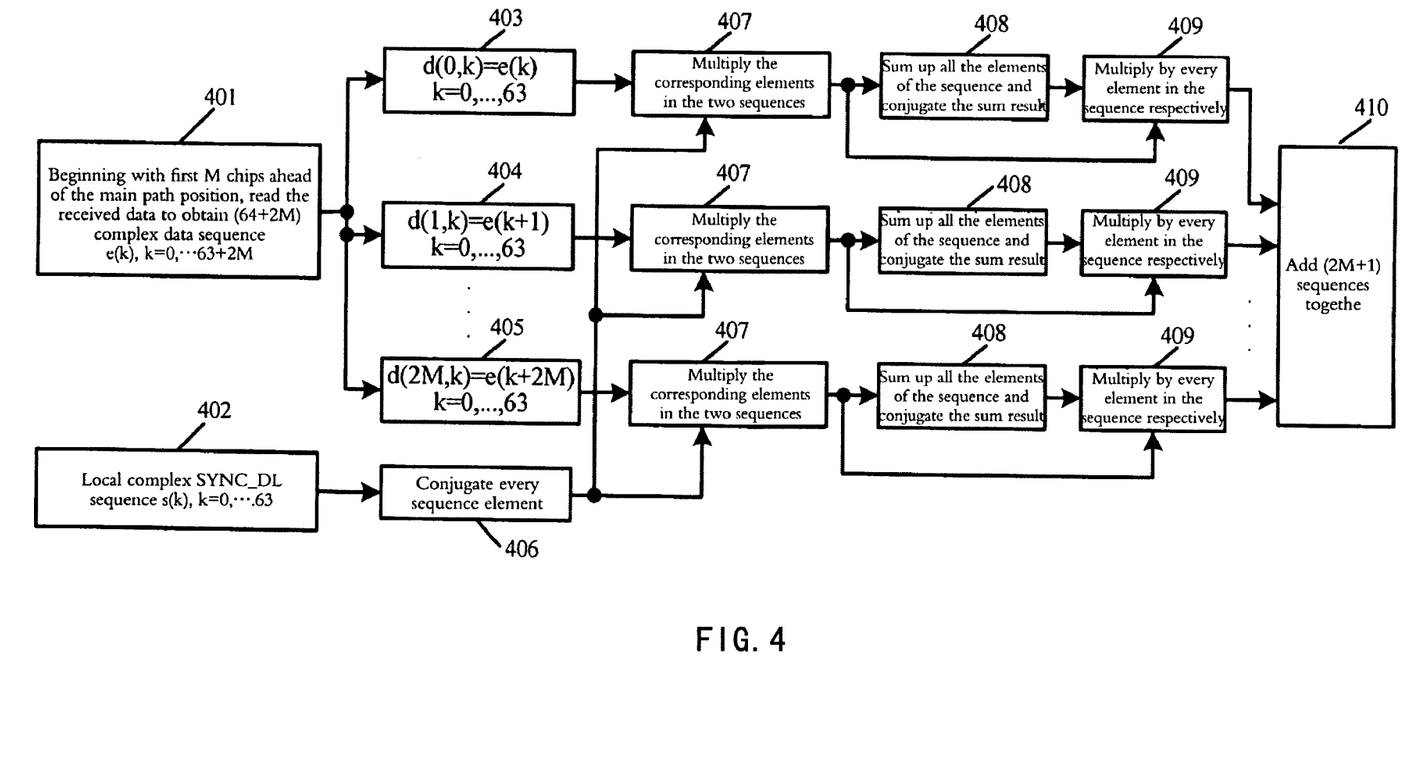
FIG. 4 is a flow chart principally showing the multi-path combination of the SYNC_DL signals received from one base station.

The process of step 202 of multi-path combining SYNC_DL signals received from a subscriber terminal will be further described with reference to FIG. 4, as shown in FIG. 4.

In step 401, 64+2M points of data are read beginning from M chips ahead of Peak$_n$ in the SYNC_DL signals received at DwPTS, i.e., 64+2M received data is read beginning from M chips ahead of the position of the main path, and a complex sequence of 64+2M is obtained, e(k), k=0, 1, . . . , 63+2M, marked as a vector e, where 64 is the length of the SYNC_DL code.

In step 402, the SYNC_DL codes numbered SYNC_ID are complex operated and the complex SYNC_DL codes are obtained, i.e., the local complex SYNC_DL code sequence s(k), k=0, 1, . . . , 63, marked as $\underline{s_n}$.

Then, in step 406, conjugating operation of each element of the sequence s(k) is performed, and a sequence s*(k) is obtained.

Because e(k+1) includes a phase shift, in order to eliminate the phase shift between subsequent two phases, in step 403, let d(0,k)=e(k), k=0, 1, . . . , 63; in step 404, let d(1,k)=e(k+1), k=0, 1, . . . , 63, . . . , and in step 405, let d(2M,k)=e(k+2M), k=0, 1, . . . , 63.

In step 407, each element of the sequence d(i,k) (i=0, 1, . . . , 2M, k=0, 1, . . . , 63) obtained in steps 403~405 is multiplied by the corresponding element of the sequence s*(k) obtained in step 406 respectively.

In step 408, all elements of the sequence obtained in step 407 are summed up and then conjugated. In steps 403~step 408, shift multiplex correlation of $\underline{e}$ and $\underline{s}^*_n$ are performed, and a result $\underline{cor}_n$ is obtained as follows:

$$cor_{n,i} = \sum_{k=0}^{63} e_{i+k} \cdot s^*_{n,k}, i = 0, 1, \ldots, 2M,$$

here, $e_{i+k}$ is the d(i,k) and the e(i+k).

In step 409, the result of shift multiplex correlation is multiplied by all elements of the sequence, then, in step 410, all 2M+1 sequences, i.e., multi-path combining the SYNC_DL signal of each path, are summed up and a vector $\underline{U}_n$ is calculated as follows.

$$U_{n,k} = \sum_{i=0}^{2M} e_{i+k} \cdot s^*_{n,k} \cdot cor^*_{n,i}, k = 0, 1, \ldots, 63,$$

The value of M is integrally dependent on both the time delay extension of the received signals and the effect of noise. In the embodiment of the invention, M=4.

The third step, in step 203, multi-path combined SYNC_DL signals of each base station are further combined.

combining the multi-path combined SYNC_DL signals of each effective base station is to combine the calculation results of the SYNC_DL codes, and equal gain combination is used:

$$U_k = \sum_{n=1}^{N} U_{n,k}, k = 0, 1, \ldots, 63;$$

and a weighting combination may also be used $$U_k = \sum_{n=1}^{N} U_{n,k} \cdot P_n, k = 0, 1, \ldots, 63,$$

where the weighting coefficients $P_n$ can be obtained by the following formula:

$$P_n = \sum_{i=0}^{2M} |cor_{n,i}|^2, i = 0, 1, \ldots, 2M, n = 1, 2, \ldots, N,$$

Because there is coherent property among the SYNC_DL signals from each effective base station while noncoherent property among noises, it is possible to improve the SNR (or SIR) of available signals by combining the multi-path combined SYNC_DL signals from each effective base station so that the SYNC_DL signals received by a subscriber terminal may be efficiently utilized.

Based on theory formula, the sequence combined by the SYNC_DL signals from each effective base station can be approximately represented as follows:

$$U_k = A_k \cdot \exp(j \cdot 2\pi \cdot \Delta f \cdot k \cdot T_C + \phi_0) + N_k, k = 0, 1, \ldots, 63,$$

where, $U_k$ is the kth symbol value in the combined SYNC_DL signal sequence, k=0, 1, . . . , 63;

$A_k$ is magnitude of combined SYNC_DL signals valid in the kth symbol;

exp(x) indicates exponent operation of complex x;

$\Delta f$ is carrier frequency offset, which is the exact value in theory;

$T_C$ is pulse width of each chip;

$\phi_0$ is initial phase of the SYNC_DL signals received by a subscriber terminal, range of which is between 0~2π;

$N_k$ is the complex noise value or interference noise value in the kth symbol.

The fourth step, in step 204, rough estimation values of carrier frequency offset are calculated by using the combined signals.

Based on the theoretical formula in step 203, it can be seen from the expression of $U_k$ that in the combined SYNC_DL signal sequence, a variation rate of phase between symbols is associated with a carrier frequency offset $\Delta f$. Therefore, a carrier frequency offset can be roughly estimated by using the combined SYNC_DL signal sequence. In one embodiment of the invention, $$\Delta \hat{f} = \frac{1}{2\pi \cdot L \cdot T_C} \frac{1}{P} \sum_{k=0}^{P-1} \text{angle}(U_k^* \cdot U_{k+L}),$$

Where $\Delta \hat{f}$ is a rough estimation of the carrier frequency offset, $T_C$ is an pulse width of each chip, and angle (x) is an operation of the phase angle of complex x. Values P and L will meet formula: P+L≦64, and P≧1, L≧1.

Above formula indicates the effect of noise (or interference) can be minimized by using a phase difference between two symbols spaced by L to estimate the carrier frequency offset, and then averaging the estimated values for P times.

In another embodiment of the invention, $$\Delta \hat{f} = \frac{1}{2\pi \cdot L \cdot T_C} \text{angle}\left[\sum_{k=0}^{P-1} (U_k^* \cdot U_{k+L})\right],$$

Where $\Delta \hat{f}$ is rough estimated value of the carrier frequency offset, $T_C$ is pulse width of each chip, and angle (x) presents the operation of the phase angle of complex x. Values P and L will meet formula: P+L≦64, and P≧1, L>1.

In order to minimize calculating amount of repeatedly calculating phase angle, the above formula indicates to firstly sum up the phase differences between two symbols spaced L, and then calculate phase angles to estimate the carrier frequency offset.

Due to the phases of two consecutive symbols are close together, an angle jitter of the multiplied phase angle will be greater. Therefore, it is preferable to multiply two symbols spaced L to avoid the angle jitter to be more great.

In the embodiment of the invention, P=L=32.

The invention also provides an device for estimating carrier frequency offset in a subscriber terminal, which corresponding to the steps shown in FIG. 2, comprising a decision module for determining number of base stations, from which the subscriber terminal receives SYNC_DL signal, based on the SYNC_DL signal received by the subscriber terminal and the main path positions of the SYNC_DL signals from each base station, and then outputting the number of effective base stations and the main path position of each signal to a combining module; the combining module for multi-path combining the SYNC_DL signal from each effective base station based on the main path position of a signal, and then combining the multi-path combined SYNC_DL signal of each effective base station. The number of SYNC_DL signal in each effective base station to be combined is the number of effective base stations determined in the decision module, and then outputting the combined SYNC_DL signal to a frequency offset acquiring module; and a frequency offset acquiring module for estimating carrier frequency offset of the subscriber terminal according to the combined SYNC signals received. The device may further comprise a multi-path combining module for multi-path combining the signals from each effective base station and outputting the multi-path combined signal to the combining module.

Figure 5:
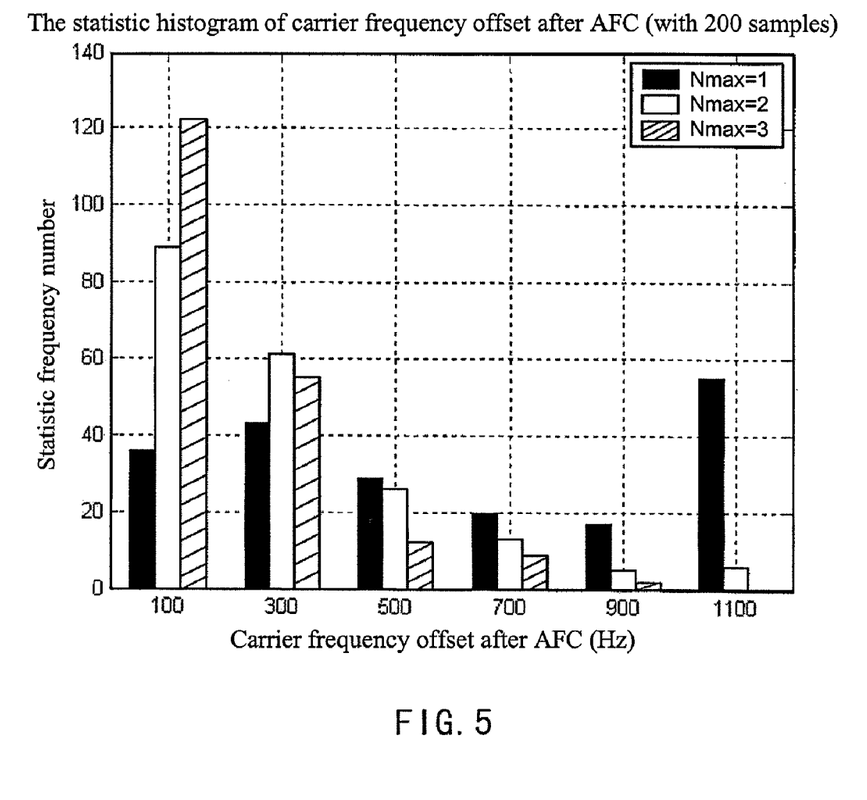
FIG. 5 shows the simulation outcome according to an embodiment of the invention.

FIG. 5 shows the simulation outcome of the embodiment of the invention. In this simulation, we assume that the subscriber terminal (UE) receives simultaneously the SYNC_DL signal from 3 base stations having same frequency, and the relative power received from three base stations are 0 dB, −0.5 dB and −1 dB respectively, with corresponding SNR of 3 dB, 2.5 dB and 2 dB. The deviation of a carrier frequency from a nominal frequency of these 3 base stations are uniformly distributed within (−100 Hz, 100 Hz). The relative path time delays of the three SYNC signals received by the subscriber terminal are distributed uniformly within 0-4 chips, with time delay resolution of ⅛ chip. The initial carrier frequency offset of UE is distributed uniformly within (−10 kHz, 10 kHz). The channel condition is an additive white Gaussian noise (AWGN) channel.

UE carrier frequency offset is roughly adjusted by using the method provided by the invention. Parameters are selected as follows: K=4, $V_T$=4, M=4. The simulation outcome is shown in FIG. 5. $N_{max}$=1 indicates that the carrier frequency offset is estimated by using the SYNC signal from one base station, $N_{max}$=2 indicates that the carrier frequency offset is estimated by using the SYNC signal from two base stations, at most, having same frequency, and $N_{max}$=3 indicates that the carrier frequency offset is estimated by using the SYNC signal from three base stations, at most, having a same frequency. Statistic Frequency Number indicates the number of samples which fall into a predetermined range of the carrier frequency offset. It can be seen from FIG. 5, when UE simultaneously receives the SYNC signals from 3 base stations having same frequency and transmission powers from each base station is not much different from each other, if the carrier frequency offset is estimated by using the SYNC signal only from one base station ($N_{max}$=1), then there is still about 27% of carrier frequency offset to be over 1 kHz after AFC. But if the carrier frequency offset is estimated by using the SYNC signal from three base stations having same frequency, it is possible to keep the carrier frequency offset under 1 kHz and the adjustment accuracy thereof will be increased greatly.

In summary, the description above is only the preferred embodiments of the invention but will not limit the protection scope of the invention.

What is claimed is:

1. A method for estimating carrier frequency offset in subscriber terminals in TD-SCDMA system, the method comprising:
    A. determining number of effective base stations with same carrier frequency from which more than one signals are received by a subscriber terminal and main path positions of each signal;
    B. combining the signals of each base station with same carrier frequency corresponding to the number of effective base stations with same carrier frequency based on the main path positions obtained in step A;
    C. calculating a rough estimation value of the carrier frequency offset based on combined signal in step B;
    wherein the determining number of effective base stations with same carrier frequency from which more than one signals are received by a subscriber terminal in step A comprises:
    A1. calculating peak power value of each signal received by the subscriber terminal, and selecting the peak power values of predefined maximum number of base stations with same carrier frequency from higher to lower;
    A2. determining the number of effective base stations with same carrier frequency from the signals determined in step A1 by the predefined maximum number of base stations with same carrier frequency are received by the subscriber terminal by comparing the ratio of the highest peak power value from the order in step A1 to the subsequent peak power values with a given threshold;
    wherein step A2 further comprises:
    A21. numbering the peak power values ordered from the highest to the lowest and setting a current sequence number as predefined number of the base stations with same carrier frequency;
    A22. determining whether the highest peak power value and a peak power value corresponding to the current sequence number are greater than the given threshold, if so, setting the number of effective base stations with same carrier frequency from which the signals are received by a subscriber terminal as the value of the current sequence number, otherwise, the current sequence number decreases by one and returns back to step A22.

2. A method as claimed in claim 1, wherein the signals are synchronous downlink pilot signals, and step A1 further comprises steps:
    A11. shift multiple correlating a local synchronous downlink pilot code and a received synchronous downlink pilot signal resulting in a power value of the synchronous downlink pilot signals received by the subscriber terminal;
    A12. determining peak power values corresponding to each of the synchronous downlink pilot codes.

3. A method as claimed in claim 2, wherein the method further comprises steps in between step A11 and step A12: selecting the power values of each frame of more than one frames and averaging the power values of each frame.

4. A method as claimed in claim 1, further comprises, before step A, reading vector data of 128 chips while receiving synchronous downlink pilot signals at the beginning of a downlink pilot time slot.

5. A method as claimed in claim 1, further comprises a step before step B: multi-path combining signals of each base station with same carrier frequency.

6. A method as claimed in claim 5, wherein the step of multi-path combining signals of each base station with same carrier frequency comprises steps:

beginning from a point of previously predetermined number of the peak power value, reading data of synchronous downlink pilot signals at a point which is 2 times of a predefined value added length of the synchronous downlink pilot code;

performing Max Ratio Combination after eliminating phase difference between symbols of multi-path synchronous downlink pilot signal with different time delay and the phase difference of delay path.

7. A method as claimed in claim 1, wherein step B of incorporating the signals of each base station with same carrier frequency corresponding to the number of base stations with same carrier frequency is: equal gain combining or weighted combining signals of each base station with same carrier frequency corresponding to the number of base stations with same carrier frequency to obtain an combined signal sequence.

8. A method as claimed in claim 7, wherein step C is to obtain a rough estimating value of the carrier frequency offset according to the phase difference between two symbols spaced by a defined distant in the combined signal sequence.

9. A method as claimed in claim 8, wherein step C further comprises:

estimating carrier frequency offset for a predefined times, and then averaging them to get a carrier frequency offset estimation.

10. A method as claimed in claim 8, wherein step C is to sum up the phase differences between two symbols spaced by a defined distant in the incorporated signal sequence, and then computing the phase angle to get the carrier frequency offset estimation.

\* \* \* \* \*